(12) United States Patent
Poremba

(10) Patent No.: US 9,264,537 B2
(45) Date of Patent: Feb. 16, 2016

(54) SPECIAL EMERGENCY CALL TREATMENT BASED ON THE CALLER

(71) Applicant: Todd Poremba, Seattle, WA (US)

(72) Inventor: Todd Poremba, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 25 days.

(21) Appl. No.: 13/705,276

(22) Filed: Dec. 5, 2012

(65) Prior Publication Data

US 2014/0003587 A1    Jan. 2, 2014

Related U.S. Application Data

(60) Provisional application No. 61/566,928, filed on Dec. 5, 2011.

(51) Int. Cl.
*H04M 11/04*    (2006.01)
*H04M 3/436*    (2006.01)
*H04M 3/51*    (2006.01)

(52) U.S. Cl.
CPC ............ *H04M 3/436* (2013.01); *H04M 3/5116* (2013.01); *H04M 2201/14* (2013.01); *H04M 2203/551* (2013.01)

(58) Field of Classification Search
CPC H04M 15/755; H04M 3/5116; H04M 7/0024
See application file for complete search history.

(56) References Cited

U.S. PATENT DOCUMENTS

| 4,625,081 A | 11/1986 | Lotito |
| 4,972,484 A | 11/1990 | Theile |
| 5,283,570 A | 2/1994 | De Luca |
| 5,311,516 A | 5/1994 | Kuznicki |

(Continued)

FOREIGN PATENT DOCUMENTS

| WO | WO99/22546 | 5/1999 |
| WO | WO01/45342 | 6/2001 |

(Continued)

OTHER PUBLICATIONS

Yilin Ahao, Efficient and reliable date transmission for cellular and GPS based mayday systems, Nov. 1997, IEEE, IEEE Conference on Intelligent Transportation System, 1997. ITSC 97, 555-559.

(Continued)

*Primary Examiner* — Duc Nguyen
*Assistant Examiner* — Assad Mohammed
(74) *Attorney, Agent, or Firm* — William H. Bollman

(57) ABSTRACT

A blacklist of known harassing or non-legitimate emergency calls is maintained. An incoming emergency call is checked against emergency call records to determine if multiple emergency calls have been made recently, from the same general location, and destined to the same PSAP. Feedback is provided regarding the number of recent calls made and the possibility of a false positive, based on call history from known handsets in the area, including the possibility of a phone with a known MEID/ESN, when powered up, receiving the same 911-xxx-xxxx. Blacklisting may be approved or not based on the feedback. A telephone number or MIN may be placed on a "blacklist" with a 'timer'. Subsequent calls to that phone number will be assigned a different SIP URI (a unique URI per destination determined prior to lookup on the blacklist) and be directed elsewhere. The call may be completed to an administrative line.

10 Claims, 2 Drawing Sheets

(56) References Cited

U.S. PATENT DOCUMENTS

| | | |
|---|---|---|
| 5,327,529 A | 7/1994 | Fults |
| 5,351,235 A | 9/1994 | Lahtinen |
| 5,530,655 A | 6/1996 | Lokhoff |
| 5,530,914 A | 6/1996 | McPheters |
| 5,539,829 A | 7/1996 | Lokhoff |
| 5,636,276 A | 6/1997 | Brugger |
| 5,661,755 A | 8/1997 | Van de Kerkhof |
| 5,699,053 A | 12/1997 | Jonsson |
| 5,704,029 A | 12/1997 | Wright, Jr. |
| 5,712,900 A | 1/1998 | Maupin |
| 5,721,781 A | 2/1998 | Deo et al. |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossmann |
| 5,812,087 A | 9/1998 | Krasner |
| 5,841,396 A | 11/1998 | Krasner |
| 5,857,201 A | 1/1999 | Wright, Jr. |
| 5,874,914 A | 2/1999 | Krasner |
| 5,896,369 A | 4/1999 | Worsta |
| 5,922,074 A | 7/1999 | Richard |
| 5,930,250 A | 7/1999 | Klok |
| 5,937,344 A | 8/1999 | Zicker |
| 5,945,944 A | 8/1999 | Krasner |
| 5,946,629 A | 8/1999 | Sawyer |
| 5,960,362 A | 9/1999 | Grab |
| 5,974,300 A | 10/1999 | La Porta |
| 5,983,099 A | 11/1999 | Yai |
| 5,999,124 A | 12/1999 | Sheynblat |
| 6,002,936 A | 12/1999 | Roel-Ng |
| 6,032,051 A | 2/2000 | Hall |
| 6,052,081 A | 4/2000 | Krasner |
| 6,058,338 A | 5/2000 | Agashe |
| 6,061,018 A | 5/2000 | Sheynblat |
| 6,061,346 A | 5/2000 | Nordman |
| 6,064,336 A | 5/2000 | Krasner |
| 6,081,229 A | 6/2000 | Soliman |
| 6,085,320 A | 7/2000 | Kaliski |
| 6,104,931 A | 8/2000 | Havinis |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,150,980 A | 11/2000 | Krasner |
| 6,178,505 B1 | 1/2001 | Schneider |
| 6,178,506 B1 | 1/2001 | Quick, Jr. |
| 6,181,939 B1 | 1/2001 | Ahvenainen |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski |
| 6,199,113 B1 | 3/2001 | Alegre |
| 6,205,330 B1 | 3/2001 | Winbladh |
| 6,208,290 B1 | 3/2001 | Krasner |
| 6,215,441 B1 | 4/2001 | Moeglein |
| 6,219,557 B1 | 4/2001 | Havinis |
| 6,239,742 B1 | 5/2001 | Krasner |
| 6,247,135 B1 | 6/2001 | Feague |
| 6,249,873 B1 | 6/2001 | Richard |
| 6,253,074 B1 | 6/2001 | Carlsson |
| 6,260,147 B1 | 7/2001 | Quick, Jr. |
| 6,275,692 B1 | 8/2001 | Skog |
| 6,275,849 B1 | 8/2001 | Ludwig |
| 6,275,937 B1 | 8/2001 | Hailpern |
| 6,304,635 B1 | 10/2001 | Iwami |
| 6,308,269 B2 | 10/2001 | Proidl |
| 6,313,786 B1 | 11/2001 | Sheynblat |
| 6,321,091 B1 | 11/2001 | Holland |
| 6,321,092 B1 | 11/2001 | Fitch |
| 6,321,257 B1 | 11/2001 | Kotola et al. |
| 6,324,542 B1 | 11/2001 | Wright, Jr. |
| 6,327,473 B1 | 12/2001 | Soliman |
| 6,330,313 B1 | 12/2001 | Hunt |
| 6,333,919 B2 | 12/2001 | Gaffney |
| 6,360,093 B1 | 3/2002 | Ross |
| 6,360,102 B1 | 3/2002 | Havinis |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,449,473 B1 | 9/2002 | Raivisto |
| 6,449,476 B1 | 9/2002 | Hutchison, IV |
| 6,456,852 B2 | 9/2002 | Bar |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,464 B1 | 2/2003 | Santhoff |
| 6,519,466 B2 | 2/2003 | Pander |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,560,534 B2 | 5/2003 | Abraham |
| 6,570,530 B2 | 5/2003 | Gaal |
| 6,571,095 B1 | 5/2003 | Koodli |
| 6,574,558 B2 | 6/2003 | Kohli |
| 6,584,307 B1 | 6/2003 | Antonucci |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,621,452 B2 | 9/2003 | Knockeart |
| 6,628,233 B2 | 9/2003 | Knockeart |
| 6,633,255 B2 | 10/2003 | Krasner |
| 6,640,184 B1 | 10/2003 | Rabe |
| 6,650,901 B1 | 11/2003 | Schuster |
| 6,661,372 B1 | 12/2003 | Girerd |
| 6,665,539 B2 | 12/2003 | Sih |
| 6,665,541 B1 | 12/2003 | Krasner |
| 6,677,894 B2 | 1/2004 | Sheynblat |
| 6,678,357 B2 | 1/2004 | Stumer |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,871 B2 | 4/2004 | Piispanen |

(56) References Cited

U.S. PATENT DOCUMENTS

| | | |
|---|---|---|
| 6,724,342 B2 | 4/2004 | Bloebaum |
| 6,725,159 B2 | 4/2004 | Krasner |
| 6,731,940 B1 | 5/2004 | Nagendran |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | karnik |
| 6,744,858 B1 | 6/2004 | Ryan |
| 6,745,038 B2 | 6/2004 | Caalaway |
| 6,747,596 B2 | 6/2004 | Orler |
| 6,748,195 B1 | 6/2004 | Phillips |
| 6,751,464 B1 | 6/2004 | Burg |
| 6,756,983 B1 | 6/2004 | Borosh |
| 6,757,544 B2 | 6/2004 | Rangarajan |
| 6,757,545 B2 | 6/2004 | Nowak |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,779,049 B2 | 8/2004 | Altman |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,501 B2 | 11/2004 | Kinnunen |
| 6,813,560 B2 | 11/2004 | Va Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke |
| 6,829,475 B1 | 12/2004 | Lee |
| 6,832,373 B2 | 12/2004 | O'Neill |
| 6,839,021 B2 | 1/2005 | Sheynblat |
| 6,842,715 B1 | 1/2005 | Gaal |
| 6,847,618 B2 | 1/2005 | Laursen |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,734 B2 | 3/2005 | Voor |
| 6,868,074 B1 | 3/2005 | Hanson |
| 6,873,854 B2 | 3/2005 | Crockett |
| 6,876,734 B1 | 4/2005 | Summer |
| 6,882,850 B2 | 4/2005 | McConnell |
| 6,885,869 B2 | 4/2005 | Raith |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,898,274 B2 | 5/2005 | Galt |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,922,565 B2 | 7/2005 | Rhodes |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,747 B2 | 1/2006 | Chithambaram |
| 6,996,720 B1 | 2/2006 | De Mello |
| 7,024,321 B1 | 4/2006 | Deninger |
| 7,024,393 B1 | 4/2006 | Peinado |
| 7,031,724 B2 | 4/2006 | Ross |
| 7,047,411 B1 | 5/2006 | De Mello |
| 7,065,203 B1 * | 6/2006 | Huart et al. ............. 379/266.06 |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,136,466 B1 | 11/2006 | Gao |
| 7,136,838 B1 | 11/2006 | Peinado |
| 7,151,946 B2 | 12/2006 | Maggenti |
| 7,171,220 B2 | 1/2007 | Belcea |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,194,249 B2 | 3/2007 | Phillips |
| 7,200,380 B2 | 4/2007 | Havlark |
| 7,209,969 B2 | 4/2007 | Lahti |
| 7,221,959 B2 | 5/2007 | Lindqvist |
| 7,245,900 B1 | 7/2007 | Lamb |
| 7,245,910 B2 | 7/2007 | Osmo |
| 7,246,187 B1 | 7/2007 | Ezra |
| 7,260,186 B2 | 8/2007 | Zhu |
| 7,260,384 B2 | 8/2007 | Bales |
| 7,302,250 B2 * | 11/2007 | Chin .................... H04M 3/436 |
| | | 455/404.1 |
| 7,321,773 B2 | 1/2008 | Hines |
| 7,330,899 B2 | 2/2008 | Wong |
| 7,333,480 B1 | 2/2008 | Clarke |
| 7,366,157 B1 | 4/2008 | Valentine |
| 7,369,530 B2 | 5/2008 | Keagy |
| 7,382,773 B2 | 6/2008 | Schoeneberger |
| 7,394,896 B2 | 7/2008 | Norton |
| 7,412,049 B1 * | 8/2008 | Koch ...................... 379/210.02 |
| 7,428,571 B2 | 9/2008 | Ichimura |
| 7,436,769 B2 | 10/2008 | Loader |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,515,695 B1 * | 4/2009 | Chan et al. ................. 379/88.18 |
| 7,522,182 B2 | 4/2009 | Bang |
| 7,573,982 B2 | 8/2009 | Breen |
| 7,602,886 B1 | 10/2009 | Beech |
| 7,617,287 B2 | 11/2009 | Vella |
| 7,623,447 B1 | 11/2009 | Faccin |
| 7,626,951 B2 | 12/2009 | Croy |
| 7,627,331 B2 | 12/2009 | Winterbottom |
| 7,711,094 B2 | 5/2010 | Olshansky |
| 7,764,961 B2 | 7/2010 | Zhu |
| 7,787,611 B1 | 8/2010 | Kotelly |
| 7,881,233 B2 | 2/2011 | Bieselin |
| 7,937,066 B2 | 5/2011 | Kaltsukis |
| 7,937,067 B2 | 5/2011 | Maier |
| 2001/0021646 A1 | 9/2001 | Antonucci |
| 2001/0040886 A1 | 11/2001 | Jimenez |

(56) References Cited

U.S. PATENT DOCUMENTS

| | | |
|---|---|---|
| 2002/0037735 A1 | 3/2002 | Maggenti |
| 2002/0042260 A1 | 4/2002 | Saucedo |
| 2002/0052214 A1 | 5/2002 | Maggenti |
| 2002/0055924 A1 | 5/2002 | Liming |
| 2002/0058515 A1 | 5/2002 | Holler |
| 2002/0061760 A1 | 5/2002 | Maggenti |
| 2002/0069079 A1 | 6/2002 | Vega |
| 2002/0069529 A1 | 6/2002 | Wieres |
| 2002/0085515 A1 | 7/2002 | Jaynes |
| 2002/0085538 A1 | 7/2002 | Leung |
| 2002/0086676 A1 | 7/2002 | Hendrey |
| 2002/0099802 A1 | 7/2002 | Marsh |
| 2002/0102996 A1 | 8/2002 | Jenkins |
| 2002/0112047 A1 | 8/2002 | Kushwaha |
| 2002/0118650 A1 | 8/2002 | Jagadeesan |
| 2002/0123354 A1 | 9/2002 | Nowak |
| 2002/0126656 A1 | 9/2002 | Park |
| 2002/0147023 A1 | 10/2002 | Sawada |
| 2002/0154221 A1 | 10/2002 | Ishimaru |
| 2002/0164998 A1 | 11/2002 | Younis |
| 2002/0173317 A1 | 11/2002 | Nykanen |
| 2002/0188680 A1 | 12/2002 | McCormick |
| 2003/0009602 A1 | 1/2003 | Jacobs |
| 2003/0012148 A1 | 1/2003 | Peters |
| 2003/0026245 A1 | 2/2003 | Ejzak |
| 2003/0037163 A1 | 2/2003 | Kitada |
| 2003/0044654 A1 | 3/2003 | Holt |
| 2003/0065788 A1 | 4/2003 | Salomaki |
| 2003/0069002 A1 | 4/2003 | Hunter |
| 2003/0072318 A1 | 4/2003 | Lam |
| 2003/0078064 A1 | 4/2003 | Chan |
| 2003/0081557 A1 | 5/2003 | Mettala |
| 2003/0081752 A1 | 5/2003 | Trandal |
| 2003/0086539 A1 | 5/2003 | McCalmont |
| 2003/0096623 A1 | 5/2003 | Kim |
| 2003/0101329 A1 | 5/2003 | Lahti |
| 2003/0103484 A1 | 6/2003 | Oommer |
| 2003/0108176 A1 | 6/2003 | Kung |
| 2003/0109245 A1 | 6/2003 | McCalmont |
| 2003/0115261 A1 | 6/2003 | Mohammed |
| 2003/0118160 A1 | 6/2003 | Holt |
| 2003/0119521 A1 | 6/2003 | Tipnis |
| 2003/0119528 A1 | 6/2003 | Pew |
| 2003/0125021 A1 | 7/2003 | Tell |
| 2003/0135493 A1 | 7/2003 | Phelan |
| 2003/0148757 A1 | 8/2003 | Meer |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes |
| 2003/0196105 A1 | 10/2003 | Fineberg |
| 2003/0201931 A1 | 10/2003 | Durst |
| 2003/0204640 A1 | 10/2003 | Sahinoja |
| 2003/0222901 A1 | 12/2003 | Houck |
| 2003/0223381 A1 | 12/2003 | Schroderus |
| 2004/0002326 A1 | 1/2004 | Maher |
| 2004/0032485 A1 | 2/2004 | Stephens |
| 2004/0041729 A1 | 3/2004 | Rowitch |
| 2004/0043775 A1 | 3/2004 | Kennedy |
| 2004/0064500 A1 | 4/2004 | Kolar |
| 2004/0068724 A1 | 4/2004 | Gardner |
| 2004/0076277 A1 | 4/2004 | Kuusinen |
| 2004/0078694 A1 | 4/2004 | Lester |
| 2004/0098497 A1 | 5/2004 | Banet |
| 2004/0107143 A1 | 6/2004 | Niemi |
| 2004/0132465 A1 | 7/2004 | Mattila |
| 2004/0150518 A1 | 8/2004 | Phillips |
| 2004/0152493 A1 | 8/2004 | Phillips |
| 2004/0157175 A1 | 8/2004 | Matsumoto |
| 2004/0176123 A1 | 9/2004 | Chin |
| 2004/0180671 A1 | 9/2004 | Spain |
| 2004/0181689 A1 | 9/2004 | Kiyoto |
| 2004/0184584 A1 | 9/2004 | McCalmont |
| 2004/0190497 A1 | 9/2004 | Knox |
| 2004/0198386 A1 | 10/2004 | Dupray |
| 2004/0203568 A1 | 10/2004 | Kikland |
| 2004/0203732 A1 | 10/2004 | Brusilovsky |
| 2004/0203854 A1 | 10/2004 | Nowak |
| 2004/0203919 A1 | 10/2004 | Ross |
| 2004/0204847 A1 | 10/2004 | Yanai |
| 2004/0205151 A1 | 10/2004 | Sprigg |
| 2004/0225878 A1 | 11/2004 | Costa-Requena |
| 2004/0229632 A1 | 11/2004 | Flynn |
| 2004/0242238 A1 | 12/2004 | Wang |
| 2004/0247090 A1 | 12/2004 | Nurmela |
| 2005/0021769 A1 | 1/2005 | Kim |
| 2005/0028034 A1 | 2/2005 | Gantman |
| 2005/0030977 A1 | 2/2005 | Casey |
| 2005/0039135 A1 | 2/2005 | Othmer |
| 2005/0039178 A1 | 2/2005 | Marolia |
| 2005/0041578 A1 | 2/2005 | Huotari |
| 2005/0048987 A1 | 3/2005 | Glass |
| 2005/0053209 A1 | 3/2005 | D'Evelyn |
| 2005/0063519 A1 | 3/2005 | James |
| 2005/0071251 A1 | 3/2005 | Linden |
| 2005/0074107 A1 | 4/2005 | Renner |
| 2005/0078612 A1 | 4/2005 | Lang |
| 2005/0083911 A1 | 4/2005 | Grabelsky |
| 2005/0083923 A1 | 4/2005 | Kimata |
| 2005/0086467 A1 | 4/2005 | Asokan |
| 2005/0101335 A1 | 5/2005 | Kelly |
| 2005/0107673 A1 | 5/2005 | Ball |
| 2005/0111630 A1 | 5/2005 | Potorny |
| 2005/0112030 A1 | 5/2005 | Gaus |
| 2005/0135569 A1 | 6/2005 | Dickinson |
| 2005/0136885 A1 | 6/2005 | Kaltsukis |
| 2005/0148351 A1 | 7/2005 | Reding |
| 2005/0148353 A1 | 7/2005 | Hicks |
| 2005/0169248 A1 | 8/2005 | Truesdale |
| 2005/0174991 A1 | 8/2005 | Keagy |
| 2005/0181805 A1 | 8/2005 | Gallagher |
| 2005/0186948 A1 | 8/2005 | Gallagher |
| 2005/0188078 A1 | 8/2005 | Kotzin |
| 2005/0195954 A1 | 9/2005 | Klein |
| 2005/0201528 A1 | 9/2005 | Meer |
| 2005/0201529 A1 | 9/2005 | Nelson |
| 2005/0209995 A1 | 9/2005 | Aksu |
| 2005/0213537 A1 | 9/2005 | Ingimundarson |
| 2005/0216300 A1 | 9/2005 | Appelman |
| 2005/0238156 A1 | 10/2005 | Turner |
| 2005/0239458 A1 | 10/2005 | Hurtta |
| 2005/0259675 A1 | 11/2005 | Tuohino |
| 2005/0261002 A1 | 11/2005 | Cheng |
| 2005/0265318 A1 | 12/2005 | Khartabil |
| 2005/0271051 A1 | 12/2005 | Holloway |
| 2005/0272424 A1 | 12/2005 | Gallagher |
| 2005/0272449 A1 | 12/2005 | Gallagher |
| 2005/0282518 A1 | 12/2005 | D'Evlyn |
| 2005/0287979 A1 | 12/2005 | Rollender |
| 2005/0289097 A1 | 12/2005 | Trossen |
| 2006/0008065 A1 | 1/2006 | Longman |
| 2006/0010200 A1 | 1/2006 | Mousseau |
| 2006/0023747 A1 | 2/2006 | Koren |
| 2006/0025158 A1* | 2/2006 | Leblanc ............... G01C 21/206 455/456.2 |
| 2006/0026288 A1 | 2/2006 | Acharya |
| 2006/0053225 A1 | 3/2006 | Poikselka |
| 2006/0058049 A1 | 3/2006 | McLaughlin |
| 2006/0068753 A1 | 3/2006 | Karpen |
| 2006/0069503 A1 | 3/2006 | Suomela |
| 2006/0072729 A1 | 4/2006 | Lee |
| 2006/0073812 A1 | 4/2006 | Punaganti |
| 2006/0077911 A1 | 4/2006 | Shaffer |
| 2006/0079236 A1 | 4/2006 | Del Pino |
| 2006/0088152 A1 | 4/2006 | Green |
| 2006/0104306 A1 | 5/2006 | Adamczyk |
| 2006/0106774 A1 | 5/2006 | Cohen |
| 2006/0120517 A1 | 6/2006 | Moon |
| 2006/0125692 A1 | 6/2006 | Wang |
| 2006/0135132 A1 | 6/2006 | Cai |
| 2006/0135177 A1 | 6/2006 | Winterbottom |
| 2006/0154665 A1 | 7/2006 | Svensson |

(56) References Cited

U.S. PATENT DOCUMENTS

| | | |
|---|---|---|
| 2006/0184617 A1 | 8/2006 | Nicholoas |
| 2006/0188083 A1 | 8/2006 | Breen |
| 2006/0189303 A1 | 8/2006 | Rollender |
| 2006/0193447 A1 | 8/2006 | Schwartz |
| 2006/0205383 A1 | 9/2006 | Rollender |
| 2006/0212558 A1 | 9/2006 | Sahinoja |
| 2006/0234639 A1 | 10/2006 | Kushwaha |
| 2006/0234698 A1 | 10/2006 | Fok |
| 2006/0236258 A1 | 10/2006 | Othmer |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0008885 A1 | 1/2007 | Bonner |
| 2007/0019614 A1 | 1/2007 | Hoffmann |
| 2007/0021908 A1 | 1/2007 | Jaugilas |
| 2007/0022011 A1 | 1/2007 | Altberg |
| 2007/0026854 A1 | 2/2007 | Nath |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0041516 A1 | 2/2007 | Dickinson |
| 2007/0049288 A1 | 3/2007 | Lamprecht |
| 2007/0060097 A1 | 3/2007 | Edge |
| 2007/0070980 A1 | 3/2007 | Phelps |
| 2007/0081635 A1 | 4/2007 | Croak |
| 2007/0115941 A1 | 5/2007 | Patel |
| 2007/0121601 A1 | 5/2007 | Kikinis |
| 2007/0160036 A1 | 7/2007 | Smith |
| 2007/0162228 A1 | 7/2007 | Mitchell |
| 2007/0182631 A1 | 8/2007 | Berlinsky |
| 2007/0201623 A1 | 8/2007 | Hines |
| 2007/0202844 A1 | 8/2007 | Wilson |
| 2007/0206568 A1 | 9/2007 | Silver |
| 2007/0206613 A1 | 9/2007 | Silver |
| 2007/0238448 A1 | 10/2007 | Gallagher |
| 2007/0242660 A1 | 10/2007 | Xu |
| 2007/0253429 A1 | 11/2007 | James |
| 2007/0263610 A1 | 11/2007 | Mitchell |
| 2007/0293205 A1 | 12/2007 | Henderson |
| 2008/0032703 A1 | 2/2008 | Krumm |
| 2008/0037715 A1 | 2/2008 | Prozeniuk |
| 2008/0063153 A1 | 3/2008 | Krivorot |
| 2008/0065775 A1 | 3/2008 | Polk |
| 2008/0080691 A1 | 4/2008 | Dolan |
| 2008/0081646 A1 | 4/2008 | Morin |
| 2008/0117859 A1 | 5/2008 | Shahidi |
| 2008/0186164 A1 | 8/2008 | Emigh |
| 2008/0205603 A1* | 8/2008 | Allison et al. ............ 379/88.12 |
| 2008/0208671 A1 | 8/2008 | Ehrlich |
| 2008/0228926 A1 | 9/2008 | Shiratzky |
| 2008/0235511 A1 | 9/2008 | O'Brien |
| 2008/0267172 A1 | 10/2008 | Hines |
| 2008/0313000 A1 | 12/2008 | Degeratu |
| 2009/0003535 A1 | 1/2009 | Grabelsky |
| 2009/0020447 A1 | 1/2009 | Elenbass |
| 2009/0049529 A1* | 2/2009 | Felger .................. H04M 15/68 726/4 |
| 2009/0128404 A1 | 5/2009 | Martino |
| 2009/0129396 A1 | 5/2009 | Bakker |
| 2009/0198733 A1 | 8/2009 | Gounares |
| 2009/0204600 A1 | 8/2009 | Kalik |
| 2009/0237210 A1 | 9/2009 | Ciesla |
| 2009/0284348 A1 | 11/2009 | Pfeffer |
| 2010/0003954 A1 | 1/2010 | Greene |
| 2010/0010860 A1 | 1/2010 | Bose |
| 2010/0029244 A1 | 2/2010 | Moodbidri |
| 2010/0069034 A1 | 3/2010 | Dickinson |
| 2010/0125892 A1 | 5/2010 | Tanizawa |
| 2010/0142386 A1 | 6/2010 | Snapp |
| 2011/0113060 A1 | 5/2011 | Martini |
| 2011/0131414 A1 | 6/2011 | Cheng |
| 2011/0211682 A1* | 9/2011 | Singh ...................... H04M 1/57 379/142.05 |

FOREIGN PATENT DOCUMENTS

| | | |
|---|---|---|
| WO | WO2004/025941 | 3/2004 |
| WO | WO2004/098213 | 11/2004 |
| WO | WO2006/071271 | 7/2006 |

OTHER PUBLICATIONS

International Search Report received in PCT/US2011/001990 dated Apr. 24, 2012.

Intrado MSAG Prep for E911 Program and Documentation, Intrado Inc., Longmont, CO, Sep. 14, 2006 Accessed: Nov. 8, 2011.

International Search Report received in PCT/US2012/00208 dated Jul. 6, 2012.

International Search Report received in PCT/US2012/00266 dated Aug. 3, 3012.

Location Services (LCS); Functional description; Stage 2; ETSI TS 101 724, Jun. 2004, Section 4, Section 5.6.6 Figure 3, Section 7.6.2 Figure 30.

* cited by examiner

SPECIAL EMERGENCY CALL TREATMENT BASED ON THE CALLER

The present application claims priority from U.S. Provisional No. 61/566,928, entitled "Special Emergency Call Treatment Based on the Caller", filed Dec. 5, 2011, to Todd Poremba, the entirety of which is explicitly incorporated herein by reference.

BACKGROUND OF THE INVENTION

1. Field of the Invention

This invention relates generally to telecommunications. More particularly, it relates to public safety.

2. Background of Related Art

There are many handsets that do not register for service with any Commercial Mobile Radio Service (CMRS) carrier. Such handsets are referred to as non-initialized, or non-service initialized (NSI) handsets. Even without a registered CMRS carrier non-initialized handsets are permitted to complete emergency calls to 9-1-1 because there is too great a risk that registration of a legitimate subscriber may fail when roaming onto another carrier's network, and this as a matter of public policy should not prevent the subscriber from placing an emergency call. Moreover, handsets do not register instantly after being powered on, and an emergency call for help should not be delayed while waiting for the completion of registration otherwise necessary for commercial services.

Some handsets may be lost, stolen, thrown away, etc. and may be used by unknown individuals for malicious purposes. Emergency calls to 9-1-1 from these handsets are no longer properly linked to an individual having pre-registered location information, and as such an emergency call made by someone other than the pre-registered person may not be reliably or easily traced to a precise location associated with the current use of the handset. Furthermore, subsequent unknown (to the carrier) individuals making use of a lost, stolen, etc. handset can make numerous anonymous harassing calls to 9-1-1 using these phones, and there is little chance of discovering the identity of the unauthorized individual. Harassing calls to emergency services are made with more frequency than would be thought, and interfere with day-to-day Public Safety operations, posing a risk to legitimate callers and responders.

By the time a harassing emergency call reaches a selective router, the only identification of the initiating handset is the dialed digits (e.g., "911") followed by a representation of the last seven digits of the phone's electronic ID; this number is sometimes represented as 911-xxx-xxxx. There are only 10 million possible numbers (000-0000 through 999-9999) to differentiate between over an estimated 400 million wireless phones in the U.S. In other words, if electronic identification numbers were evenly distributed, there would be 40 phones that would have the same 911-xxx-xxxx. Because of this, blockage of emergency calls from known harassing handsets is not desirable in the rare (but possible) event that a handset with a different area code (but the same seven digits xxx-xxxx) attempts to make a legitimate emergency call. Plus, some 9-1-1 calls come from handsets that have recently powered up, and not all calls from a particular 911-xxx-xxxx can be blocked indefinitely.

Some solutions have been described from within the carrier networks. Others have attempted to solve the problem from within an E9-1-1 network. None are known to have been implemented.

Exemplary emergency call blocking techniques are described in co-owned U.S. Pat. No. 8,103,242 entitled "E911 Call Blocking For Non-Initialized Wireless Telephones" to Richard Dickinson; U.S. Pat. No. 8,175,570 entitled "E911 Call Blocking For Non-Initialized Wireless Telephones" to Richard Dickinson; and U.S. Pat. No. 8,116,722 entitled "E911 Call Blocking For Non-Initialized Wireless Telephones" to Richard Dickinson.

Disadvantages of the present technologies include the fact that carrier facing solutions require costly changes within carrier networks, and public Safety solutions risk inadvertent blockage of non-offending legitimate emergency callers.

SUMMARY OF THE INVENTION

A method and apparatus for blacklisting a probable source of a harassing or otherwise non-legitimate emergency call comprises requesting a check of an incoming emergency call against emergency call records to determine if multiple emergency calls have been made recently all from a same source, all from a same general location, and all destined to a same public safety answering point (PSAP). Feedback is received regarding a possibility of the incoming emergency call being a non-legitimate call, and an identifying telephone number or mobile identification number (MIN) of the source is added to a blacklist when the possibility is beyond an acceptable threshold amount.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present invention provides for the combination of 1) 911-xxx-xxxx of a non-service initialized (NSI) handset with 2) a destination PSAP, 3) the caller's coarse location, 4) a call history, and 5) PSAP personnel input, harassing (i.e., non-legitimate) emergency calls can be safely and reliably blocked, with the risk of an improper blockage (a "false positive") being reduced significantly.

With a NENA defined NG9-1-1 network, a custom header is implemented in a Location to Service Translation query (i.e.: the 911-xxx-xxxxx for a non-service initialized (NSI) handset). A query is made to a supplemental policy store (or a similar query is made to an alternate data source) to identify a given telephone number (TN) mobile identification (MIN), etc., (e.g. a 911-xxx-xxxx) as being on a "blacklist" of known sources of harassing (i.e., non-legitimate) emergency calls.

The blacklist of known sources of harassing or non-legitimate emergency calls may be created by appropriate public safety personnel, e.g., over a web-interface. The entered telephone number is checked against emergency call records to determine if multiple emergency calls had been made recently, all from approximately the same location, and destined to the same PSAP.

The web interface provides relevant feedback such as the number of recent emergency calls made, and the possibility of a false positive (based on emergency call history from known handsets in the area, including the possibility of a handset (mobile phone) with a known mobile equipment identifier (MEID)/electronic serial number (ESN), when powered up, receiving the same 911-xxx-xxxx).

Public safety answering point (PSAP) personnel can approve the blacklisting or not based on the feedback. Moreover, or alternatively, the blacklisting may be automated based on a match to predetermined criteria, at the discretion of the authorized public safety authority.

If, according to the preferred configuration, enough of the above factors are present, the telephone number, MIN, etc. may be placed on the "blacklist" with a configured timer associated therewith. Subsequent calls to that phone number are assigned a different SIP URI (a unique URI per destination determined prior to lookup on the blacklist), and are directed to an interactive voice recording (IVR) system (registered to multiple SIP URIs). The interactive voice recording explains that the caller has been identified as known to have recently made an illegitimate or otherwise harassing emergency call(s). The caller will then be given the opportunity to interact with the system to complete a call to the PSAP (or other call center) with a lower priority.

In the case of a PSAP, the call may be routed to a line monitored by administrative personnel instead of a dedicated emergency 9-1-1 trunk line.

Figure 1:
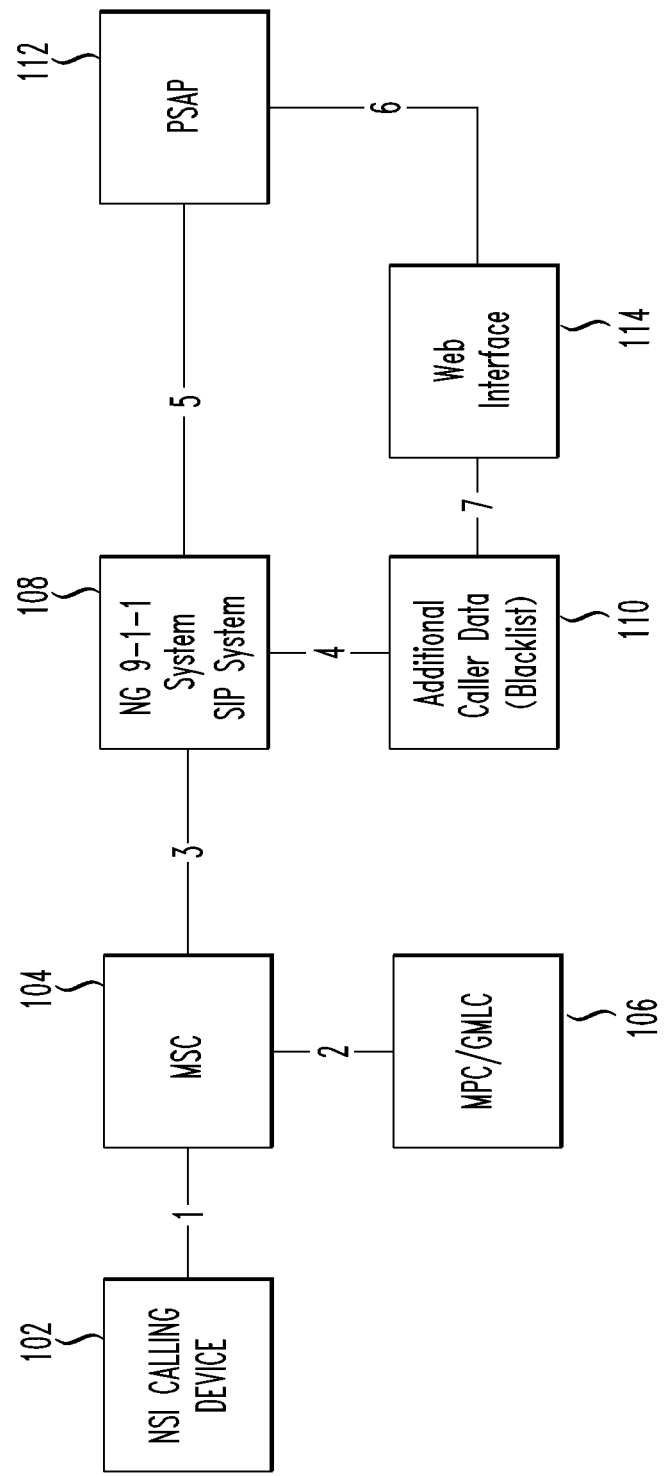
FIG. 1 shows special emergency call treatment based on a given non-service initialized calling device, in accordance with the principles of the present invention.

FIG. 1 shows special emergency call treatment based on a given non-service initialized calling device, in accordance with the principles of the present invention.

In particular, as shown in step 1 of FIG. 1, a non-service initialized calling device 102 attempts to place an emergency call (e.g., to "9-1-1").

In step 2, cell tower data (and potentially other data such as a mobile equipment identifier (MEID) or electronic serial number (ESN)) are delivered from a mobile switching center MSC 104 to a mobile positioning center (MPC) (or gateway mobile location center (GMLC)) 106, and the mobile positioning center (MPC)/(GMLC) 106 returns routing instructions.

In step 3, a next generation 9-1-1 (NG9-1-1) system SIP system 108 receives the call and performs initial call treatment.

In step 4, the selected public safety answering point (PSAP) 112 is determined to have a blacklist, which is then queried for a match to the calling number of the present emergency call. In this given example, the calling number of the present emergency non-initialized service (NSI) call does not match any current number in the blacklist.

In step 5, the non-initialized emergency call is completed to the PSAP 112.

In step 6, after a given number (e.g., several) emergency calls are received (e.g., within a given time) from the same non-service initialized (NSI) device 102, the PSAP 112 enters the known information about the harassing non-service initialized (NSI) device (e.g., its telephone number, MIN, etc.) into an appropriate non-service initialized (NSI) web interface 114.

In step 7, call logs are reviewed, and the number of emergency calls, logged location of each of the emergency calls, and the known possibility of each call being a false positive, is determined and recorded. The PSAP 112 makes a determination to commit the entry of the telephone number, MIN, etc. of the non-service initialized caller into the blacklist for that specific PSAP 112.

Figure 2:
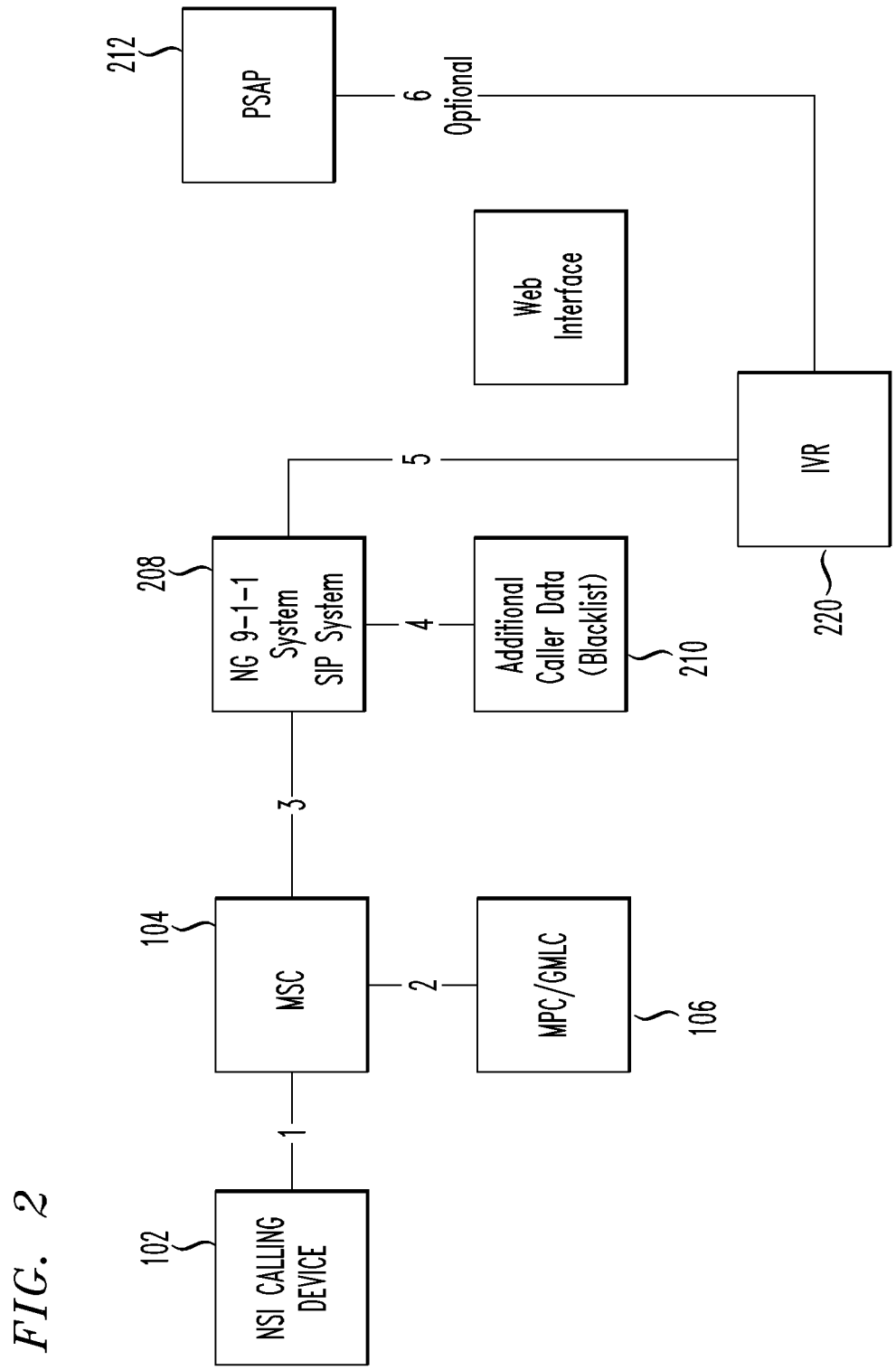
FIG. 2 shows another embodiment of special emergency call treatment based on a given non-service initialized calling device, in accordance with the principles of the present invention.

FIG. 2 shows another embodiment of special emergency call treatment based on a given non-service initialized calling device, in accordance with the principles of the present invention.

In particular, as shown in step 1 of FIG. 2, the non-service initialized (NSI) call is dialed.

In step 2, cell tower and potentially other data (such as a mobile equipment identifier (MEID) or electronic serial number (ESN)) are delivered to the MPC/GMLC and the MPC/GMLC returns routing instructions.

In step 3, NG9-1-1 receives the call and performs initial call treatment.

In step 4, the public safety answering point (PSAP) selected is determined to have a blacklist. This blacklist is checked. In this example, the blacklist matches the non-service initialized (NSI) call. The public safety answering point's (PSAP's) SIP universal resource indicator (URI) is replaced with a SIP URI specific to that PSAP but which routes to the interactive voice recording (IVR).

In step 5, the interactive voice recorder plays a recorded message

In step 6, after several calls from the same non-service initialized (NSI) call, the public safety answering point (PSAP) personnel enter the information into the non-service initialized (NSI) web interface.

In step 7, call logs are checked and the number of calls, locations of the calls, and the known possibility of false positives is determined and recorded. The PSAP personnel decide to commit the entry of the telephone number, MIN, etc. into the blacklist for that specific public safety answering point (PSAP).

While the invention has been described with reference to the exemplary embodiments thereof, those skilled in the art will be able to make various modifications to the described embodiments of the invention without departing from the true spirit and scope of the invention.

What is claimed is:

1. A method of blacklisting a source device of a non-legitimate emergency call, comprising:
   receiving an emergency call from a physical wireless device associated with a given location;
   initiating a request to an additional caller data server in communication with a blacklisted caller database to perform a lookup of other emergency calls recently made from a same general location as said given location, and all routed to a same public safety answering point (PSAP);
   receiving a feedback message regarding a possibility of said received emergency call being a non-legitimate emergency call; and
   adding, to said blacklisted called database, an identifying telephone number or mobile identification number (MIN) of said physical wireless device when said possibility is beyond an acceptable threshold amount.

2. The method of blacklisting a source device of a non-legitimate emergency call according to claim 1, wherein:
   subsequent calls received from said source are assigned a different SIP URI per destination determined prior to said lookup on said blacklisted caller database; and
   said subsequent calls are directed to a voice recording system.

3. The method of blacklisting a source device of a non-legitimate emergency call according to claim 2, wherein:
   said voice recording system is interactive.

4. The method of blacklisting a source device of a non-legitimate emergency call according to claim 2, wherein:
   said voice recording system is registered to multiple SIP URIs.

5. The method of blacklisting a source device of a non-legitimate emergency call according to claim 2, wherein:

said voice recording system indicates that a source of said emergency call has been identified as having made a non-legitimate emergency call.

6. The method of blacklisting a source device of a non-legitimate emergency call according to claim 1, further comprising:

giving said physical wireless device an opportunity to complete an emergency call to emergency personnel albeit with a lower priority when said possibility of said incoming emergency call is above said acceptable threshold amount.

7. The method of blacklisting a source device of a non-legitimate emergency call according to claim 1, wherein:

said acceptable threshold amount is predetermined before said incoming emergency call is received.

8. The method of blacklisting a source device of a non-legitimate emergency call according to claim 1, wherein:

said received feedback message includes a number of recent emergency calls made from said physical wireless device.

9. The method of blacklisting a source device of a non-legitimate emergency call according to claim 1, further comprising:

blacklisting said telephone number or MIN associated with said received emergency call based on said received feedback message.

10. The method of blacklisting a source device of a non-legitimate emergency call according to claim 1, wherein:

said identifying telephone number or min is a 911-xxx-xxxx number.

* * * * *